United States Patent [19]

Busse

[11] Patent Number: 4,585,690
[45] Date of Patent: Apr. 29, 1986

[54] CELLULAR GLASS REINFORCED COMPOSITE MATERIAL

[76] Inventor: James G. Busse, 5830 Ferree Street, Pittsburgh, Pa. 15217

[21] Appl. No.: 668,092

[22] Filed: Nov. 5, 1984

[51] Int. Cl.$^4$ .................... B32B 17/00; B32B 5/18
[52] U.S. Cl. ........................ 428/304.4; 428/311.5; 428/312.6; 428/320.2; 428/406
[58] Field of Search ............ 428/304.4, 311.1, 311.5, 428/312.2, 312.6, 312.8, 320.2, 322.7, 406

[56] References Cited

U.S. PATENT DOCUMENTS

| | | | |
|---|---|---|---|
| 3,321,414 | 5/1967 | Vieli | 428/319.1 |
| 3,691,512 | 9/1972 | Exner | 428/64 |
| 3,959,541 | 5/1976 | King et al. | 428/312.6 |
| 4,007,917 | 2/1977 | Brubaker | 428/319.7 |
| 4,247,590 | 1/1981 | Hayakawa et al. | 428/210 |

FOREIGN PATENT DOCUMENTS 1412589  11/1975  United Kingdom ............ 428/312.6

*Primary Examiner*—William J. Van Balen

[57] ABSTRACT

This invention relates to a composite material consisting of a reinforcement structure of cellular glass having a lattice of intercommunicating cells and imbedded in a continuous resin matrix. The resulting composite material has a high resistance to plastic deformation and fracture, in addition to improved ratios of stiffness modulus-to-weight and tensile-strength-to-weight, making it suitable for structural and other applications including the ability to withstand the impact of projectiles.

2 Claims, No Drawings

CELLULAR GLASS REINFORCED COMPOSITE MATERIAL

SUMMARY OF THE INVENTION

The present invention relates to the use of cellular glass having intercommunicating cells as a reinforcement for composite materials suitable for use in structural and other applications.

One object of the invention is to produce a composite material having a high resistance to plastic deformation.

A second object of the invention is to produce a composite material having a high resistance to fracture.

A third object of the invention is to produce a composite material having improved ratios of stiffness modulus-to-weight and tensile-strength-to-weight, known as specific modulus and specific strength, respectively.

A fourth object of the invention is to produce a composite material having an inorganic, incombustible, homogeneous, chemically inert, and dimensionally stable reinforcement structure.

A fifth object of the invention is to produce a composite material capable of withstanding high temperatures, high pressures, severe vibration, and the great compressive and shear forces produced by the impact of projectiles.

These and other objects of the invention will be apparent from consideration of the following specifications and claims.

A high resistance to plastic deformation can be achieved by using materials such as glass and ceramics which are incapable of plasticity because they do not permit the passage of crystalline defects which carry deformation. Although such materials may have a very high intrinsic strength, this strength is useless because the resistance to fracture is very poor. Intrinsically strong, brittle materials contain minute cracks at the surface. These cracks, known as "Griffith cracks" after their discoverer, magnify any applied mechanical load to such a degree that the material is easy broken.

Composite materials consisting of intrinsically strong materials, such as glass fibers, dispersed in an ordered or unordered manner in an intrinsically soft resin matrix to raise the material's resistance to plastic deformation are well known in the literature. It is generally believed that the soft matrix neutralizes the Griffith cracks as soon as a load is applied because the roots of the cracks, which are the sensitive sites, are blunted by localized plastic deformation before the crack can appreciably propagate.

Cellular glass with intercommunicating cells, an inorganic material with many desirable molecular properties, provides a new type of reinforcement for composite materials. The present invention consists of an open-cell glass foam embedded in a continuous resin matrix. The resin-embedded glass foam composite may be used as a structural material on its own, or as an interleaf material "sandwiched" between layers of other reinforcement or protective materials, and bonded to their surfaces. The advantages of using a sandwich structure containing honeycomb core reinforcement materials to obtain stiffness with minimum weight have been known for some time. These structures also possess a unusually high degree of impact strength.

The open-cell glass foam composite provides physical properties equal or superior to those employing tightly packed or wound, continuous shaped or rounded, hollow-filament or solid glass fibers, but at a greatly reduced manufacturing cost since no precision winding or costly shaped glass fibers are required. The composite's uniform internal structure acts as if it were a monolithic glass structure instead of a composite. Moreover, like shaped glass fibers, the surfaces of the glass walls of intercommunicating cells may be chemically, electrochemically, thermally, or otherwise molecularly "perfected" to strengthen the reinforcement structure and thus enhance the properties of the composite in which it is employed.

The excellent transverse properties of composite materials using open-cell glass foam reinforcements probably is due to the isotropic nature of glass and to the complex network structure of cellular glass's intercommunicating cells. Like other three-dimensional reinforcements, for a piece of open-cell, glass-foam-reinforced composite material to fail, segments of the glass lattice must be broken instead of the glass-resin interfaces. In order to start a crack of macroscopic proportions, multiple glass segments would have to be broken. Additionally, thermal strain is reduced in open-cell glass-foam-reinforced composites.

Glass foam with closed cells of uniform size predominates in industry due to its low density, water resistance and thermal insulating properties. Since closed-cell glass foam contains a certain proportion of open cells, open-cell glass foam may be created by altering the conditions under which glass foam is formed as described in U.S. Pat. No. 2,536,192 to Littleton and U.S. Pat. Nos. 2,544,954, 2,596,669, 2,600,525 and 2,620,597 to Ford. Cellular glass with intercommunicating cells also may be produced by opening up the walls of closed-cell glass foam as described in U.S. Pat. No. 2,596,659 to D'Eustachio. When closed-cell glass foam is subjected to fluidic pressure, the thin walls of the cells tend to rupture at their weakest points to permit intercommunication between cells but without breaking down the bodies or materially imparing their mechanical strength.

The basic open-cell glass foam "skeleton" reinforcement structure may be engineered to meet specific design requirements for composite materials by adjusting such parameters as cell size, cell geometry, density, glass composition, surface treatments, and the type of continuous resin matrix to be employed. Of critical importance is the purity of the glass mixture used to make the open-cell glass foam and the manufacturing conditions under which it is produced. Surface impurities can act as stress concentrators and decrease the strength of the glass lattice and the composite material it reinforces.

A wide variety of resins are available for use in the matrix. Silicone resins, for example, may be formulated to flow freely or with very little pressure through the cellular glass lattice, and to ensure maximum contact with its inner surfaces. Such resins also complement the thermal, chemical and physical properties of cellular glass. Other suitable resins, such as the various epoxy resinous compounds, may be applied to the reinforcement structure using heat or pressure or both. Standard vacuum techniques may be employed to reduce or eliminate voids in the continuous resin matrix. It is also possible to use a suitable resin system under pressure to open the cells of closed-cell glass foam and to permeate them at the same time as in the process previously referenced in U.S. Pat. No. 2,596,659 to D'Eustachio.

The forms of the invention herein described are by way of illustration only. It will be apparent to those skilled in the art that various modifications may be made therein without departure from the spirit of the invention or the scope of the appended claims.

Having thus described my invention, I claim:

1. A composite material consisting of a reinforcement structure composed of cellular glass having a lattice of intercommunicating cells and imbedded in a continuous resin matrix.

2. The use of the composite material as set forth in claim 1 in combination with and bonded to one or more external reinforcement materials.

* * * * *